US006537693B1

(12) United States Patent
Suzuki et al.

(10) Patent No.: US 6,537,693 B1
(45) Date of Patent: Mar. 25, 2003

(54) SECONDARY BATTERY AND METHOD OF MANUFACTURING SAME

(75) Inventors: Hiromi Suzuki, Tokyo (JP); Shigetomi Morita, Kanagawa (JP)

(73) Assignee: NEC Tokin Corporation (JP)

( * ) Notice: Subject to any disclaimer, the term of this patent is extended or adjusted under 35 U.S.C. 154(b) by 138 days.

(21) Appl. No.: 09/714,540

(22) Filed: Nov. 16, 2000

(30) Foreign Application Priority Data

Nov. 22, 1999 (JP) .......................................... 11-331030

(51) Int. Cl.[7] ........................ H01M 2/012; H01O 10/40
(52) U.S. Cl. ........................ 429/56; 429/174; 29/623.4
(58) Field of Search .......................... 429/53, 56, 174, 429/182; 29/623.4

(56) References Cited

U.S. PATENT DOCUMENTS

| 4,537,841 | A | * | 8/1985 | Wiacek et al. ................. 429/56 |
| 5,171,647 | A | * | 12/1992 | Dean et al. ................. 429/53 X |
| 5,326,655 | A | * | 7/1994 | Mix et al. ................. 429/182 X |
| 6,258,477 | B1 | * | 7/2001 | Kashihara et al. ............ 429/53 |

FOREIGN PATENT DOCUMENTS

JP    9-199106    7/1997    ............ H01M/2/34

* cited by examiner

Primary Examiner—Stephen Kalafut
(74) Attorney, Agent, or Firm—Hayes Soloway PC

(57) ABSTRACT

A secondary battery has a disconnect assembly for cutting off a current path when a pressure in the battery is abnormal, disposed in an open end of an outer casing. The disconnect assembly includes a rupture disk sealing the open end of the outer casing, a cap electrically connected to a portion of a surface of the rupture disk and serving as an outer terminal of the battery, a weld plate joined to a portion of another surface of the rupture disk and serving as an inner terminal of the battery and having vent holes, and an insulating gasket sealing a gap between the rupture disk and the outer casing and holding the rupture disk and the weld plate in an electrically insulated fashion, except for a space around a junction between the rupture disk and the weld plate. A portion of the rupture disk and the weld plate are so joined that the diffusion of atoms at a junction interface is in an initial stage. An ultrasonic welding machine is used to carry out the above joining.

18 Claims, 5 Drawing Sheets

Direction in ultrasonic vibrations

Junction
Interface

Junction
Interface

SECONDARY BATTERY AND METHOD OF MANUFACTURING SAME

BACKGROUND OF THE INVENTION

1. Field of the Invention

The present invention relates to a secondary battery having a function to cut off a current path when the pressure in the battery rises, and a method of manufacturing such a secondary battery.

2. Description of the Related Art

In recent years, there has been a demand for secondary batteries, e.g., lithium ion secondary batteries, of high energy density which can be used for a long period of time through repeated charging and discharging cycles. It is more important than ever to take sufficient safety measures for those secondary batteries. Generally, secondary batteries are of a sealed structure. Therefore, for example, when a secondary battery is overly charged, the electrolytic large amount of gas in the battery, resulting in a sharp rise of the pressure in the battery. If such a condition continues, the battery itself tends to rupture, causing a dangerous situation. One of the safety measures which have been used in secondary batteries is a current cutting-off component hereinafter referred to as "disconnect device") for cutting of a current path when the pressure in the battery rises.

One conventional disconnect device for use in secondary batteries will be described in detail below. As shown in FIGS. 1A and 1B of the accompanying drawings, a conventional secondary battery has a disconnect device disposed in an open end of outer casing 16. The disconnect device comprises rupture disk 11 having downward protrusion 11a with a flat tip end and closing the open end of outer casing 16, cap 10 electrically connected to an upper surface of rupture disk 11 by ring plate 12 and serving as an outer terminal of the battery, weld plate 14 serving as an inner terminal of the battery joined to the tip end of downward protrusion 11a and having vent holes 14a, and insulating gasket 13 sealing the gap between rupture disk 11 and outer casing 16 and holding rupture disk 11 and weld plate 14 in an electrically insulated fashion, except for a space around junction 15 between the weld plate and the rupture disk.

Insulating gasket 13 has a recess in which rupture disk 11 and cap 10 are mounted, an opening defined therein at the bottom of the recess, and a mount disposed in an inner peripheral surface of the opening and holding weld plate 14.

Weld plate 14 and rupture disk 11 are not electrically connected to each other except for junction 15.

Outer casing 16 holds therein a coiled assembly of an anode sheet, a cathode sheet, and a separator, and an electrolytic solution.

Weld plate 14 is of a circular shape. Electrically conductive tab 17 extending from the coiled assembly is welded to weld plate 14.

In the secondary battery constructed as the above, when the pressure in the battery rises, a stress is applied to rupture disk 11 in a direction to displace protrusion 11a toward cap 10, with a tensile force concentrated on junction 15 between weld plate 14 and rupture disk 11. When the tensile force exceeds the strength of junction 15, the tip end of protrusion 11a of rupture disk 11 disengages from weld plate 14, and protrusion 11a is deformed toward cap 10. The electric connection between the exterior and interior of the battery is broken, stopping the generation of a gas in the battery. As a result, the pressure in the battery is prevented from increasing.

The disconnect device should be designed such that when the pressure in the battery reaches a level tending to break the battery itself, the rupture disk will be peeled off, reliably cutting off the current path. The rupture disk is not permitted to remain undetached when the pressure in the battery reaches the level tending to break the battery itself. The rupture disk is not permitted to be detached easily due to shocks imposed when the battery drops onto a hard object.

Therefore, the mechanical strength of the junction between the weld plate and the rupture disk is an important factor for ensuring the desired reliability of the battery, and needs to be controlled at a certain value.

Japanese laid-open patent publication No.199106/1997 discloses a technique for reducing and stabilizing variations of welding strength. The publication describes that when a first plate (inner terminal plate 6) corresponding to a weld plate and a second plate (explosion-resistant valve body 3) corresponding to a rupture disk are welded, with an ultrasonic welding process, at a flat surface of the tip end of a protrusion of the first plate, variations of welding strength can be reduced and stabilized by limiting the area of the flat surface and the height of the protrusion which affect the welding strength.

However, the above publication only discloses that variations of welding strength can be reduced and stabilized by welding with an ultrasonic welding process joint surfaces whose area and shape are limited, but fails to reveal how a junction interface should be to control the peeling strength at a constant level.

When metal joint surfaces abut against each other and then the ultrasonic welding is performed, the area of intimate contact of convexities of all minute concavities and convexities on the metal joint surfaces increases, and the joining between the metal joint surfaces progresses due to diffusion of atoms at the surfaces that are held in intimate contact with each other. Thereafter, the diffusion of atoms activates the metal joint interface, eliminating voids to form molten metal regions (hereinafter referred to as "nuggets") in the metal joint surfaces. When nuggets are formed by the ultrasonic welding process, the peeling strength between the metal joint surfaces becomes equivalent to the material strength (shearing strength) of the regions where the nuggets are formed. Even with the technique disclosed in the above publication, when the diffusion of atoms progresses to the stage where nuggets are formed by the ultrasonic welding process, the peeling strength of the junction greatly depends on the material strength of the regions where the nuggets are formed, and is difficult to control merely by adjusting setting conditions for the ultrasonic welding process.

The peeling strength of the junction increases in proportion to the joined area. Therefore, when the joined area (current passing area) is increased in order to extract a large current from the secondary battery, if the metal joint surfaces are joined to achieve the same joined strength as the material strength, then the peeling strength of the junction is too large to cut off the current path.

As shown in FIGS. 1A and 1B, the electrically conductive tab extending from an electrode sheet is connected to the circular weld plate in the secondary battery. If forces are applied to the electrically conductive tab when the secondary battery is assembled or subjected to vibrations or shocks, the weld plate is liable to rotate in the joined surfaces. Since the weld plate is joined only in the junction, it produces torsional forces in the junction. Therefore, there is the problem in that the junction is unexpectedly peeled off.

SUMMARY OF THE INVENTION

It is an object of the present invention to provide a method of manufacturing a secondary battery so as to achieve a current passing area for extracting a large current from the secondary battery and also to easily control, at a constant level, the peeling strength of a junction between a rupture disk and a weld plate.

Another object of the present invention is to provide a secondary battery which has a highly reliable disconnect device including a junction that will not be detached when the secondary battery is assembled or subjected to vibrations or shocks, except when the pressure in the battery becomes abnormally high.

As a result of the inventor's study conducted to achieve the above objects, it has been found that the peeling strength of a junction can be controlled by only setting conditions of an ultrasonic welding machine if the junction is produced by the diffusion of atoms in an initial states. And the inventors have invented a shape of joined surfaces in order to reduce and stabilize variations in the peeling strength after each joining. Furthermore, since the peeling strength of the junction is smaller than that of a completely diffusion-joined junction, the inventors have invented a construction of a disconnect assembly in order to prevent a rupture disk from being easily peeled off when the secondary battery is assembled or subjected to vibrations or shocks.

According to the present invention, there is provided a method of manufacturing a secondary battery having a disconnect assembly for cutting off a current path when a pressure in the battery is abnormal, disposed in an open end of an outer casing, the disconnect assembly including a rupture disk sealing the open end of the outer casing, a cap electrically connected to a portion of a surface of the rupture disk and serving as an outer terminal of the battery, a weld plate joined to a portion of another surface of the rupture disk and serving as an inner terminal of the battery and having vent holes, and an insulating gasket sealing a gap between the rupture disk and the outer casing and holding the rupture disk and the weld plate in an electrically insulated fashion, except for a space around a junction between the weld plate and the rupture disk, the method comprising the step of joining a portion of the rupture disk and the weld plate with an ultrasonic welding machine by finishing the diffusion of atoms at a junction interface in an initial stage.

With the above method, the peeling strength of the junction between the rupture disk and the weld plate is less than the strength of joined materials. Even if the area of junction is increased to extract a large current from the secondary battery, the junction achieved by the diffusion of atoms in the initial stage is free from a failure that the current path cannot be cut off due to an excessively large peeling strength. In addition, the junction achieved by the diffusion of atoms in the initial stage can easily be produced under setting conditions of the ultrasonic welding machine.

More preferably, in the above method one of the rupture disk and the weld plate having a protrusion and the other having a recess in which the protrusion is fitted, joined surfaces of the rupture disk and the weld plate are held in biting engagement with each other with the protrusion and the recess, and a portion of the rupture disk and the weld plate are joined with an ultrasonic welding machine by finishing the diffusion of atoms at a junction interface in an initial stage. The protrusion may be a hemispherical, columnar, radial, or striped protrusion. With this method, since the joined surfaces have the protrusion and recess that are held in biting engagement with each other, the joined surfaces can easily be positioned when they are joined. Because the joined surfaces are held in biting engagement with each other by concavities and convexities, the surface area of contact is increased so as to be equal or greater than the maximum projected area (area surrounded by the outer periphery of the junction) of the joined surfaces, so that variations in the occurrence of the initial diffusion-joined region per unit area of the joints are reduced. In this manner, variations in the peeling strength of the joints are reduced and stabilized. In addition, when a force tending to displace the joined surfaces therealong is produced, the concavities and convexities on the joined surfaces prevent the joined surfaces from being displaced relatively to each other. Consequently, the effect of the force applied along the joined surfaces on the joined stage is lessened.

In the above method, adjusting the progress of the diffusion of atoms in the initial stage is capable of adjusting the peeling strength of the junction between the rupture plate and the weld plate.

The initial stage comprises a stage where the area of diffusion-joined regions formed of nuggets is not in excess of 50% of joined surfaces.

The secondary battery manufactured by the above method has means for preventing the weld plate from being turned about the junction. Preferably, the secondary battery further comprises means for preventing the weld plate from swinging(rocking) about the junction. Since both the above means prevent the weld plate from being positionally displaced, stresses are not applied to the junction when the secondary battery is assembled or subjected to vibrations or shocks. Therefore, the reliability of the secondary battery is increased.

If the insulating gasket has a recess in which the rupture disk is mounted, an opening defined in a bottom of the recess, and a mount disposed in an inner peripheral surface of the opening for mounting the weld plate therein, means for preventing a turn of the weld plate and means for preventing a swing(rock) of the weld plate may be the following structure.

For instance, means for preventing the weld plate from being turned about the junction may comprise a tooth on an outer peripheral edge thereof, and the mount of the insulating gasket may have a groove in which the tooth is fitted. Alternatively, means for preventing the weld plate from being turned about the junction may comprise the weld plate which is of a polygonal shape, and the mount may be of a shape complementary to the polygonal shape of the weld plate. Means for preventing the weld plate from swinging about the junction may comprise the mount in the form of a groove gripping opposite surfaces of the weld plate.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1A:
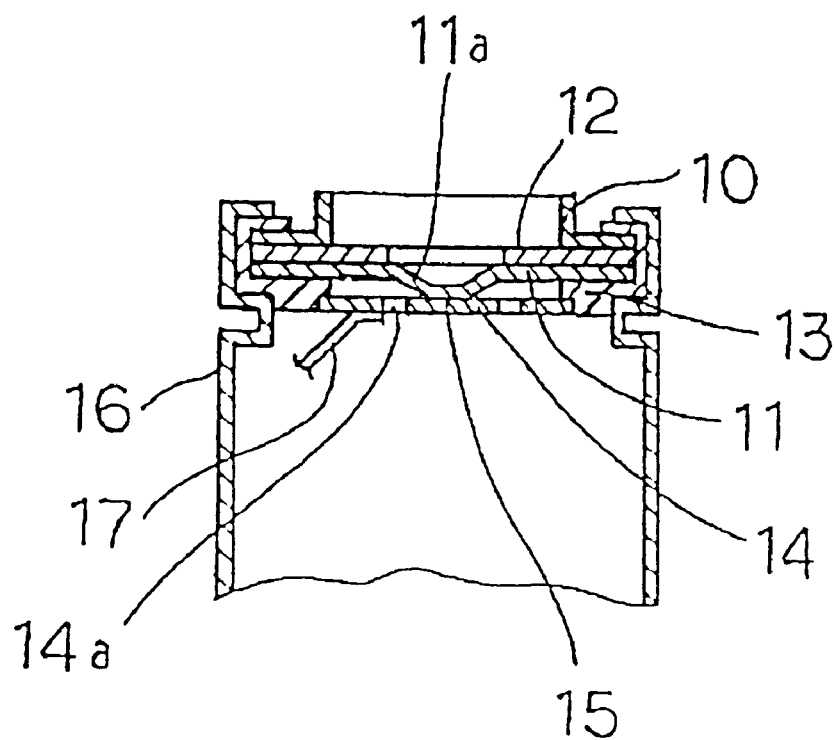
FIG. 1A is a fragmentary sectional side elevational view of parts of a disconnect device of a conventional secondary battery.
Figure 1B:
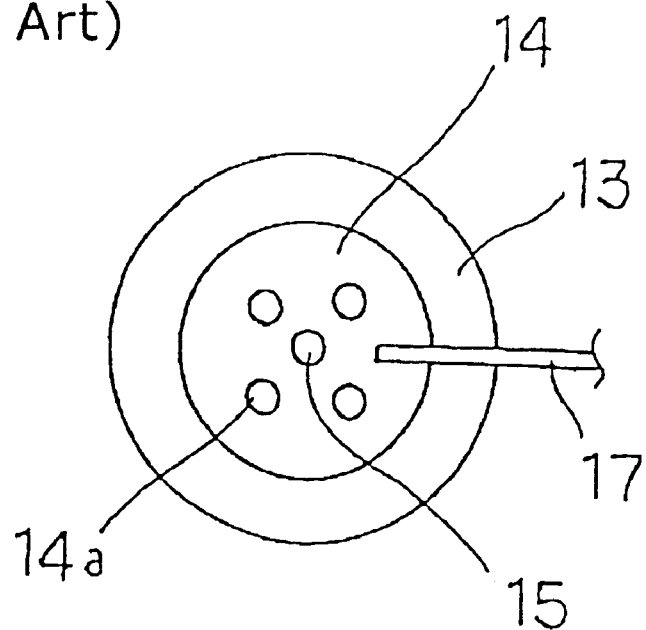
FIG. 1B is a plan view of a weld plate and associated parts, as seen from inside a battery casing, of the conventional secondary battery shown in FIG. 1A.
Figure 2:
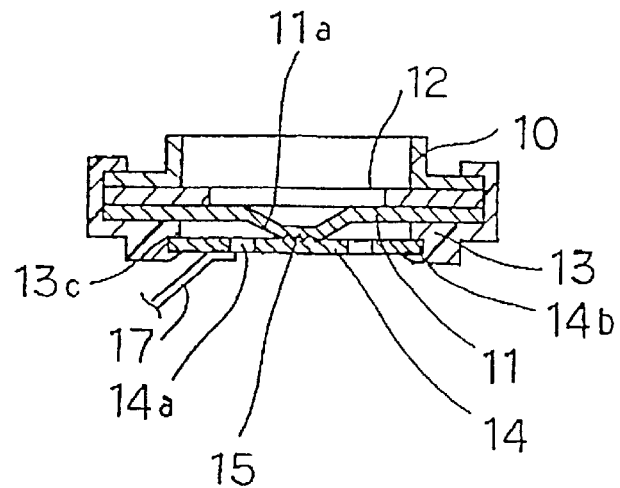
FIG. 2 is a sectional side elevational view of a disconnect device of a secondary battery according to an embodiment of the present invention.

As shown in FIG. 2, a secondary battery according to the present invention has a disconnect device comprising rupture disk 11 and weld plate 14 that are joined to each other at junction 15. Rupture disk 11 and weld plate 14 are joined to each other at junction 15 according to a process different from the conventional secondary battery shown in FIGS. 1A and 1B, and junction 15 has a shape different from the conventional secondary battery shown in FIGS. 1A and 1B.

A process of joining rupture disk 11 and weld plate 14 to each other at junction 15 according to the present invention will be described below. As shown in FIG. 2, a tip end surface of protrusion 11a of rupture disk 11 and weld plate 14 are joined to each other at junction 15 where the diffusion of atoms at a junction interface is in an initial stage. Protrusion 11a of rupture disk 11 and weld plate 14 are joined to each other by an ordinary ultrasonic welding machine. Rupture disk 11 and weld plate 14 are made of aluminum, for example, but may be made of any nonferrous metal.

Figure 9A:
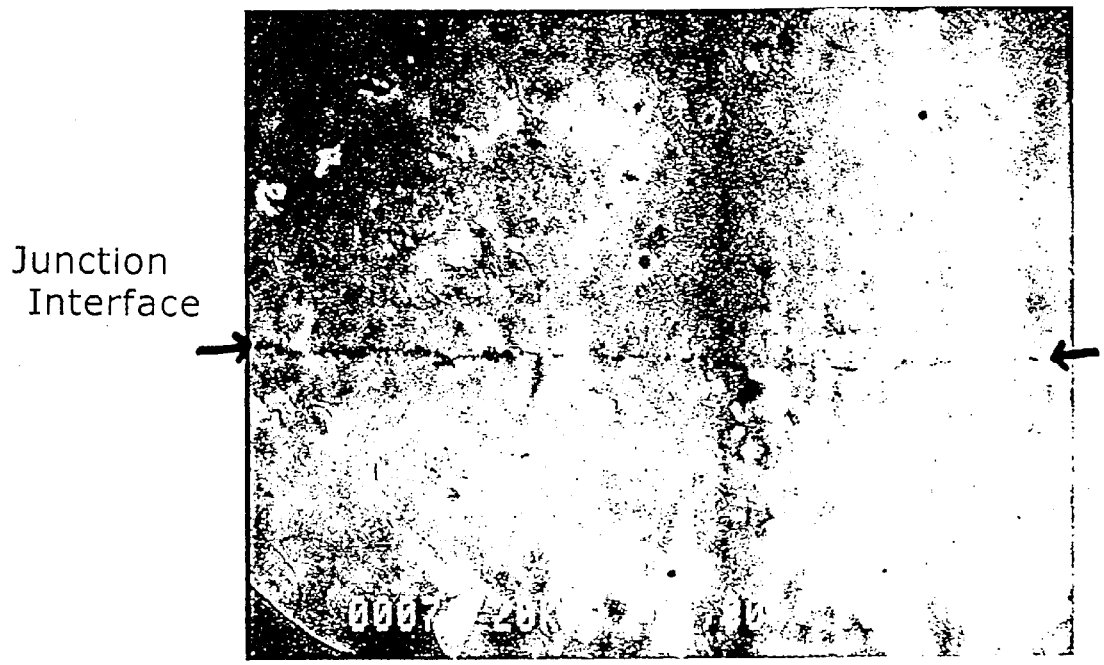
FIG. 9A is a view showing a microscopic photographic representation of a section of a junction where the diffusion of atoms at a junction interface is in an initial stage.
Figure 9B:
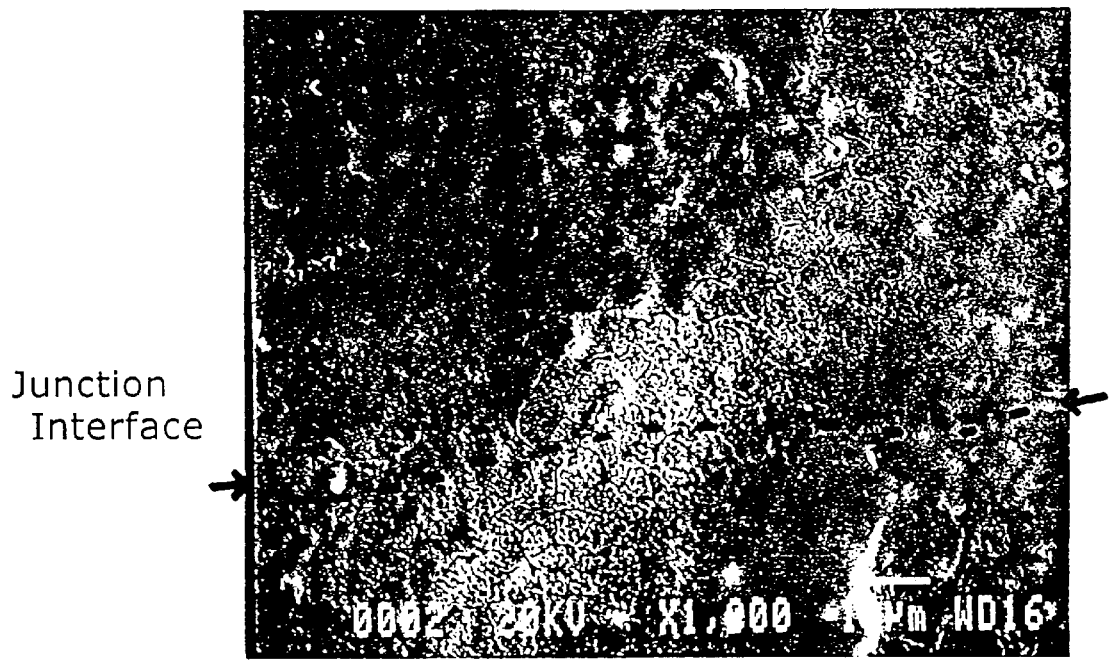
FIG. 9B. is a view showing a microscopic photographic representation of a section of a junction where complete diffusion joining is achieved.

As shown in FIG. 9A, in junction 15 achieved by initial diffusion, the diffusion of atoms at the junction interface is in the initial stage (This is a stage in which the area of diffusion-joined regions formed of nuggets should be 50% at most, or more preferably 10% or less, of the joined surfaces.). Though the ultrasonic welding machine is employed, the joining process is finished before the progress of the diffusion of atoms at the junction interface enters a latter stage (This is a stage that the area of diffusion-joined regions formed of nuggets exceeds at least 50% of the joined surfaces.). The reason for thus finishing the joining process is that if the diffusion of atoms in the joining process performed by the ultrasonic welding machine entered the latter stage, the joined materials would firmly joined to each other by nuggets that occupy half or more of the joined surfaces. Then, the peeling strength would become equivalent to the material strength of the region where the nuggets are formed, and the total area of the region where the nuggets are formed would be adjusted under ultrasonic welding conditions to control the peeling strength. However, merely adjusting setting conditions (e.g., the pressing load, the time for which ultrasonic vibrations are applied, the frequency of ultrasonic vibrations, the amount of energy of ultrasonic vibrations, etc.) for ultrasonic welding would cause an accuracy problem in controlling the peeling strength of the welded region where the welding is finished in several milliseconds units because of the high rate at which the formation of nuggets progresses. In the present embodiment, the tip end surface of protrusion 11a of rupture disk 11 and weld plate 14 are joined to each other at a joining state that the progress of the diffusion of atoms at the junction interface is finished in the initial stage by the ultrasonic welding machine. In this manner, the peeling strength of rupture disk 11 and weld plate 14 can be smaller than the joining strength achieved by the ultrasonic welding, according to which the material strength of the regions where the nuggets are formed is equal to the peeling strength. Therefore, insofar as the junction is in the initial diffusion state, it is possible to increase the joined area in order to extract a large current from the secondary battery. Moreover, since the ultrasonic welding machine, which is generally said as being usable owing to easiness in setting joining conditions, is used to carry out a diffusion joining, the junction of the initial diffusion state can easily be realized.

Figure 3A:
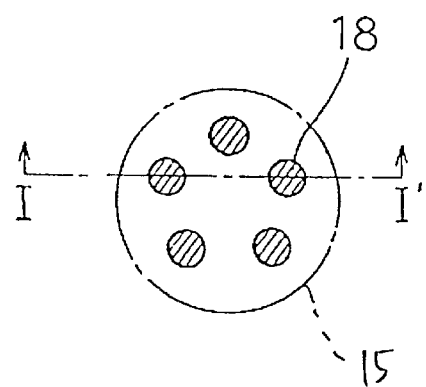
FIG. 3A is a cross-sectional view of a joint surface of a junction of the disconnect device shown in FIG. 2, the view being taken along the joint surface.
Figure 3B:
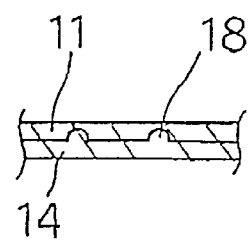
FIG. 3B is a cross-sectional view taken along line IIIB—IIIB of FIG. 3A.
Figure 4A:
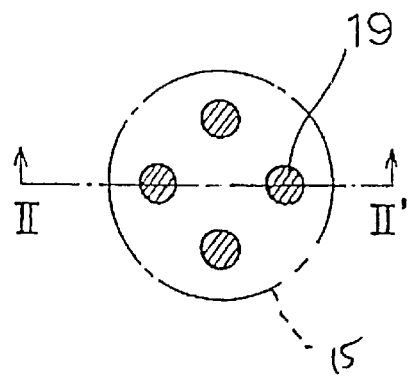
FIG. 4A is a cross-sectional view of another joint surface of a junction for the disconnect device shown in FIG. 2, the view being taken along the joint surface.
Figure 4B:
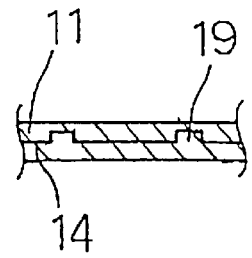
FIG. 4B is a cross-sectional view taken along line IVB—IVB of FIG. 4A.
Figure 5:
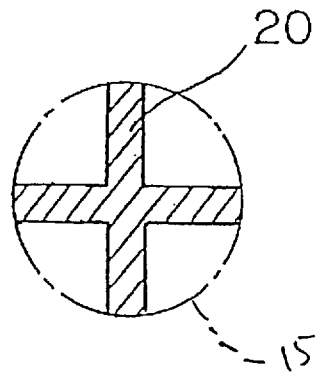
FIG. 5 is a cross-sectional view of still another joint surface of a junction for the disconnect device shown in FIG. 2, the view being taken along the joint surface.
Figure 6:
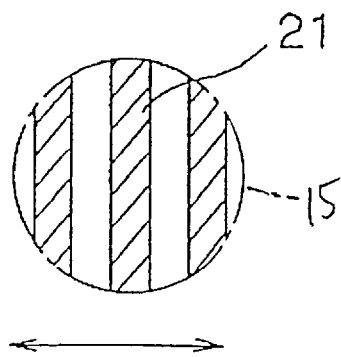
FIG. 6 is a cross-sectional view of yet another joint surface of a junction for the disconnect device shown in FIG. 2, the view being taken along the joint surface.

The shape of junction 15 will be described below. As shown in FIG. 2, in junction 15 between rupture disk 11 and weld plate 14, the joined surfaces are held in biting engagement with each other by concavities and convexities. Examples of the shape of the joined surfaces are shown in FIGS. 3A, 3B, 4A, 4B, 5, and 6. In the example shown in FIGS. 3A, 3B, the joined surfaces are held in biting engagement with each other by hemispherical protrusions 18 and complementary recesses. In the example shown in FIGS. 4A, 4B, the joined surfaces are held in biting engagement with each other by columnar protrusions 19 and complementary recesses. In FIGS. 5 and 6, one of the joined surfaces may have radial protrusions 20 or striped protrusions 21, and the other joined surface may have recesses receiving those radial protrusions 20 or striped protrusions 21. In FIGS. 5 and 6, the protrusions may have a semicircular or rectangular cross section as shown in FIG. 3B or 4B. In the example shown in FIG. 6, when the joined surfaces are joined, ultrasonic vibrations should preferably be applied in a direction perpendicular to the direction in which the striped protrusions 21 are formed. Such a direction in which ultrasonic vibrations are applied is advantageous in that stresses developed by the ultrasonic vibrations activate the metal surfaces to diffuse atoms well at the joint interface.

Using the above shapes in the joined surfaces of junction 15 is effective to reduce and stabilize variations in the peeling strength after each joining. The reason for the effectiveness of the above shapes will be described below. The diffusion of atoms in the diffusion joining process progresses from the region where the joined surfaces are intimately held against each other at an interatomic distance. The occurrence of the region where the joined surfaces are intimately held against each other varies for each joining because the minute concavities and convexities on the metal surfaces are not uniform. Since the proportion of the area of the diffusion-joined region in the joined surfaces is not constant even under the same joining conditions, it is expected that the peeling strength slightly varies for each joining. In the present embodiment, therefore, the joined surfaces are held in biting engagement with each other by concavities and convexities whose shapes are shown in FIGS. 3A, 3B, 4A, 4B, 5, and 6, thereby increasing the surface area of contact so as to be equal or greater than the maximum projected area of the joined surfaces, so that variations in the occurrence of the initial diffusion-joined region per unit area in each joining are reduced. In this manner, variations in the peeling strength after each joining are reduced, allowing the current to be cut off reliably when the pressure in the battery reaches a predetermined abnormal level.

Moreover, since the joined members are held in biting engagement with each other by concavities and convexities, the joined members can easily be positioned when they are joined. In addition, when a force applied in a direction other than the peeling direction, e.g., a force tending to displace the joined members along the joined surfaces, is produced, the concavities and convexities on the joined surfaces prevent the joined surfaces from being displaced relatively to each other. Consequently, the effect of the force applied in a direction other than the peeling direction on the joined state is lessened.

Figure 7:
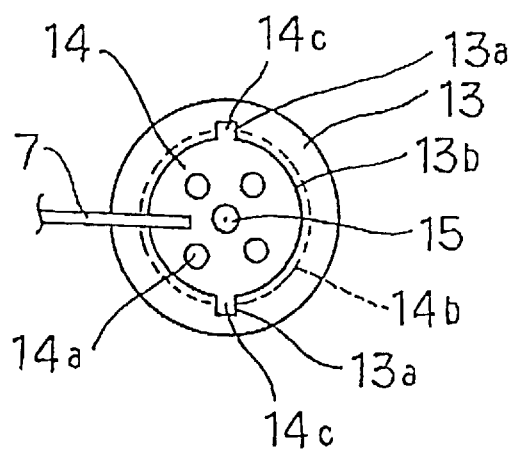
FIG. 7 is a plan view of a weld plate and associated parts, as seen from inside a battery casing, of the secondary battery shown in FIG. 2.
Figure 8:
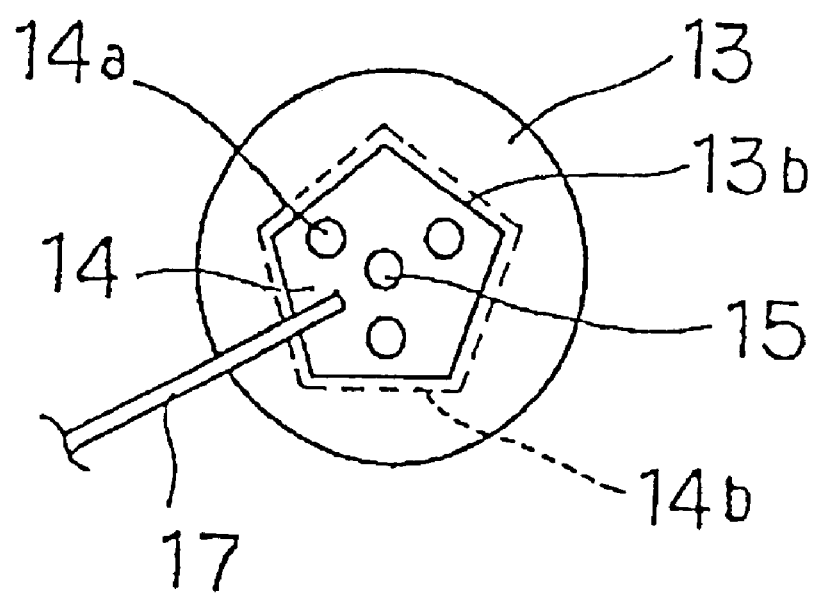
FIG. 8 is a plan view of another weld plate and associated parts, as seen from inside a battery casing, for the secondary battery shown in FIG. 2.

In the present embodiment, as shown in FIG. 2, weld plate 14 mounted in the central opening in the recessed bottom of insulating gasket 13 is of such a shape that weld plate 14 cannot rotate with respect to insulating gasket 13. For example, as shown in FIG. 7, weld plate 14 has outer peripheral edge 14b with projection 14c thereon, and insulating gasket 13 has an opening 13b for mounting weld plate 14, with grooves 13a in which projection 14c are fitted. Alternatively, as shown in FIG. 8, weld plate 14 is of a polygonal shape, and insulating gasket 13 has an opening 13b for mounting weld plate 14, of a shape complementary to the polygonal shape of weld plate 14. With their structure, even if forces are applied to electrically conductive tab 17 when the secondary battery is assembled or subjected to vibrations or shocks, weld plate 14 is prevented from being turned about junction 15. In addition, as shown in FIGS. 2, 7, and 8, a groove 13c for gripping outer peripheral edge 14b on opposite surfaces of weld plate 14 is defined in an inner peripheral surface of opening 13b for mounting weld plate 14 in insulating gasket 13. This snap-fitting structure prevents weld plate 14 from swinging(rocking) about junction 15. By combining the above structures, no stresses are applied to junction 15 produced by the initial diffusion joining when the secondary battery is assembled or subjected to vibrations or shocks. Since junction 15 is not peeled off except when the pressure in the battery becomes abnormally high, the secondary battery is highly reliable.

While preferred embodiments of the present invention have been described using specific terms, such description is for illustrative purposes only, and it is to be understood that changes and variations may be made without departing from the spirit or scope of the following claims.

What is claimed is:

1. A method of manufacturing a secondary battery having a disconnect assembly for cutting off a current path when a pressure in the battery is abnormal, disposed in an open end of an outer casing, said disconnect assembly including a rupture disk sealing the open end of said outer casing, a cap electrically connected to a portion of a surface of said rupture disk and serving as an outer terminal of the battery, a weld plate joined to a portion of another surface of said rupture disk and serving as an inner terminal of the battery and having vent holes, and an insulating gasket sealing a gap between said rupture disk and said outer casing and holding said rupture disk and said weld plate in an electrically insulated fashion, except for a space around a junction between said rupture disk and said weld plate, said method comprising the step of:

joining a portion of said rupture disk and said weld plate with an ultrasonic welding machine by finishing the diffusion of atoms at a junction interface in an initial stage, wherein said initial stage comprises a stage where an area of diffusion-joined regions formed of nuggets is at most 50% of the joined surfaces.

2. A method according to claim 1, wherein said initial stage comprises a stage where the area of diffusion-joined regions formed of nuggets is not in excess of 10% of the joined surfaces.

3. A method according to claim 1, further comprising the step of adjusting the progress of the diffusion of atoms in the initial stage thereby to adjust a peeling strength at the junction between said rupture disk and said weld plate.

4. A method of manufacturing a secondary battery having a disconnect assembly for cutting off a current path when a pressure in the battery is abnormal, disposed in an open end of an outer casing, said disconnect assembly including a rupture disk sealing the open end of said outer casing, a cap electrically connected to a portion of a surface of said rupture disk and serving as an outer terminal of the battery, a weld plate joined to a portion of another surface of said rupture disk and serving as an inner terminal of the battery and having vent holes, and an insulating gasket sealing a gap between said rupture disk and said outer casing and holding said rupture disk and said weld plate in an electrically insulated fashion, except for a space around a junction between said rupture disk and said weld plate, one of said rupture disk and said weld plate having a protrusion and the other having a recess in which said protrusion is fitted, said method comprising the steps of:

holding joined surfaces of said rupture disk and said weld plate in biting engagement with each other with said protrusion and said recess; and joining a portion of said rupture disk and said weld plate with an ultrasonic welding machine by finishing the diffusion of atoms at a junction interface in an initial stage, wherein said initial stage comprises a stage where an area of diffusion-joined regions formed of nuggets is at most 50% of the joined surfaces.

5. A method according to claim 4, wherein said initial stage comprises a stage where the area of diffusion-joined regions formed of nuggets is not in excess of 10% of the joined surfaces.

6. A method according to claim 4, further comprising the step of adjusting the progress of the diffusion of atoms in the initial stage thereby to adjust a peeling strength at the junction between said rupture disk and said weld plate.

7. A secondary battery having a disconnect assembly for cutting off a current path when a pressure in the battery is abnormal, disposed in an open end of an outer casing, said disconnect assembly comprising a rupture disk sealing the open end of said outer casing, a cap electrically connected to a portion of a surface of said rupture disk and serving as an outer terminal of the battery, a weld plate joined to a portion of another surface of said rupture disk and serving as an inner terminal of the battery and having vent holes, and an insulating gasket sealing a gap between said rupture disk and said outer casing and holding said rupture disk and said weld plate in an electrically insulated fashion, except for a space around a junction between said rupture disk and said weld plate, wherein a portion of said rupture disk and said weld plate are so joined that the diffusion of atoms at a junction interface is in an initial stage, wherein said initial stage comprises a stage where an area of diffusion-joined regions formed of nuggets is at most 50% of the joined surfaces.

8. A secondary battery according to claim 7, wherein said initial stage comprises a stage where the area of diffusion-joined regions formed of nuggets is not in excess of 10% of the joined surfaces.

9. A secondary battery according to claim 8, wherein joined surfaces of the junction between said rupture disk and said weld plate are held in biting engagement with each other by concavities and convexities.

10. A secondary battery according to claim 9, further comprising means for preventing said weld plate from being turned about said junction.

11. A secondary battery according to claim 9, further comprising means for preventing said weld plate from swinging and rocking about said junction.

12. A secondary battery having a disconnect assembly for cutting off a current path when a pressure in the battery is abnormal, disposed in an open end of an outer casing, said disconnect assembly comprising a rupture disk sealing the open end of said outer casing, a cap electrically connected to a portion of a surface of said rupture disk and serving as an outer terminal of the battery, a weld plate joined to a portion of another surface of said rupture disk and serving as an inner terminal of the battery and having vent holes, and an insulating gasket closing a gap between said rupture disk and said outer casing and holding said rupture disk and said weld plate in an electrically insulated fashion, except for a space around a junction between said rupture disk and said weld plate, said insulating gasket having a recess in which said rupture disk is mounted, an opening defined in a bottom of said recess, and a mount disposed in an inner peripheral surface of said opening for mounting said weld plate therein, wherein a portion of said rupture disk and said weld plate are so joined that the diffusion of atoms at a junction interface is in an initial stage, wherein said initial stage comprises a stage where an area of diffusion-joined regions formed of nuggets is at most 50% of the joined surfaces.

13. A secondary battery according to claim 12, wherein said initial stage comprises a stage where the area of diffusion-joined regions formed of nuggets is not in excess of 10% of the joined surfaces.

14. A secondary battery according to claim 13, wherein joined surfaces of the junction between said rupture disk and said weld plate are held in biting engagement with each other by concavities and convexities.

15. A secondary battery according to claim 14, wherein one of joined surfaces of said rupture disk and said weld plate has a hemispherical, columnar, radial, or striped protrusion, and the other has a recess in which said protrusion is fitted.

16. A secondary battery according to claim 14, wherein said weld plate has a projection on an outer peripheral edge thereof, and said mount in said insulating gasket has a groove in which said projection is fitted.

17. A secondary battery according to claim 14, wherein said weld plate is of a polygonal shape, and said mount is of a shape complementary to said polygonal shape of the weld plate.

18. A secondary battery according to claim 16 or 17, wherein said mount comprises a groove gripping opposite surfaces of said weld plate.

* * * * *